3,794,602
METHOD FOR IN SITU RECONDITIONING OF IRON CATALYST BED
Donald B. Bivens, Leo W. Patton, and John B. Wiggill, Orange, Tex., assignors to E. I. du Pont de Nemours and Company, Wilmington, Del.
No Drawing. Filed May 3, 1972, Ser. No. 249,761
Int. Cl. B01j 11/30; C07c 85/12
U.S. Cl. 252—412                                    3 Claims

ABSTRACT OF THE DISCLOSURE

A method for in situ reconditioning of a particulate iron catalyst in a fixed bed to remove accumulated chloride containing contaminant and fine catalyst particles deposited in the bed which comprises passing vertically upward through the catalyst bed at a superficial velocity in the range of 0.01 to 0.9 feet per second a dilute ammonium hydroxide solution.

BACKGROUND OF THE INVENTION

In carrying out hydrogenations over a particulate iron fixed bed catalyst system particularly in hydrogenation of adiponitrile it is observed that the catalyst bed over a period of time accumulates a considerable amount of small size particles or fines as well as a deposit of a chloride containing contaminant. This leads to increased pressure drop across the catalyst bed and the chloride contaminant, in particular, tends to deactivate the catalyst. In order to remove the catalyst fines and the chloride contaminant it has been necessary to remove the catalyst from the hydrogenation equipment for screening or washing with appropriate solutions. Such techniques entail expensive down-time of production equipment as well as operational hazards in that the activated iron catalysts are pyrophoric on exposure to the atmosphere. Accordingly, an improved method of reconditioning the particulate iron catalyst bed has been sought.

STATEMENT OF THE INVENTION

A method has now been found wherein an iron catalyst bed for hydrogenation of adiponitrile which has been degraded by deposition of chloride contaminant and/or by development of catalyst fines can be reconditioned in situ. The method comprises passing an aqueous liquid vertically upward through the bed at a superficial velocity in the range of about 0.01 to about 0.9 foot per second to remove chloride contaminant and catalyst particles of undesired size from the bed. For a catalyst bed which has become deteriorated only through formation of fines, water is a suitable liquid for the reconditioning process. For the situation where the catalyst is affected by contaminating deposit and/or catalyst fines, the use of aqueous ammonium hydroxide solution is found to be especially effective. In either case, if fines are to be removed, the superficial velocity of the aqueous liquid should be at least about 0.1 foot per second and preferably in the range of 0.2 to 0.3 foot per second to selectively remove fine particles. For the ammonium hydroxide treatment, if fines are absent, a superficial liquid velocity as low as 0.01 foot per second can be used. At a superficial velocity of one foot per second or more the catalyst bed becomes completely fluidized and selective separations cannot be effected.

After the ammonium hydroxide treatment the iron catalyst bed is normally reactivated at a temperature in the range of about 300° C. to about 600° C. in an atmosphere of hydrogen at a pressure of at least 0.01 atmosphere or in an atmosphere of hydrogen containing up to 10% by volume of ammonia. For some purposes the ammonium hydroxide treated iron catalyst may also be used directly for hydrogenation without the reactivation step.

For the hydrogenation of adiponitrile a substantially elemental iron catalyst ranging in size from 6 to 40 mesh is preferred. Still more preferred is a range of 8 to 20 mesh, the screen sizes being based on U.S. Standard Screen Sizes. Accordingly, for best results the reconditioning method should provide for removal of catalyst particles of size smaller than about 40 mesh while retaining in the bed catalyst particles of a size larger than 40 mesh. In this description the term "catalyst fines" is intended to mean catalyst particles of size smaller than about 40 mesh.

For removal of the chloride containing contaminant the concentration of ammonia in the ammonium hydroxide solution should be at least 0.5% by weight and can be as high as 10% or more. However, for economic reasons, the concentration of ammonia is maintained at as low a level as will give rapid and satisfactory removal of the chloride contaminant from the catalyst bed, and generally not greater than about 3% by weight of solution.

The time of carrying out the reconditioning will depend upon various factors such as the amount and size of fines in the bed, and the amount of accumulated contaminant. The aqueous liquid passed through the bed is conveniently supplied at ambient temperature and generally is in the range of about 20–50° C. but can be used in the range of 5 to 95° C.

This method of reconditioning, and particularly that involving the ammonium hydroxide washing has an added advantage in that the reconditioned iron catalyst shows a lower formation of by-products such as 1,2-diaminocyclohexane at the outset of an adiponitrile hydrogenation run than does virgin activated iron catalyst.

DESCRIPTION OF PREFERRED EMBODIMENTS

Examples 1, 2 and 3 illustrate the critical liquid flow rate required to remove fine particles, in particular, those smaller than 40 mesh while retaining those larger than 40 mesh. Examples 4, 5 and 6 illustrate the treatment of the bed with dilute ammonium hydroxide solution which has the effect of removing accumulated chloride contaminant as well as particles of undesired sizes.

Example 1

A catalyst bed was prepared by filling a vertical 2-inch diameter glass pipe with 8–14 mesh iron catalyst. Iron catalyst of 200–400 mesh was then introduced at the bottom of the bed and water was passed upward through the bed at a superficial velocity of 0.13 foot per second. It was observed that some of the fine catalyst particles were removed at this superficial flow velocity. Increasing the flow in step-wise fashion removed increased amounts of catalyst fines until at a flow of about one foot per second the bed was completely fluidized and selective separation of catalyst particles could no longer be effected.

Example 2

The experiment of Example 1 was repeated with the catalyst fines being introduced at the bottom of the bed but with water being passed through the bed at a superficial velocity of 0.27 foot per second. Within one to two minutes catalyst particles of 200–400 mesh had been removed from the bed with only a few particles in the 60–100 mesh and 40–60 mesh ranges remaining in the clear liquid above the bed. Particles of sizes larger than 40 mesh remained in the catalyst bed.

Example 3

To illustrate the effect of a range of superficial liquid velocity on selective removal of catalyst particles from a catalyst bed the following experiment was carried out.

Approximately 4,000 pounds of particulate iron oxide to be activated by treatment with hydrogen at elevated temperature was charged into a vertical cylindrical cartridge of 16⅞ inch diameter and 16 feet 3¾ inches length. To facilitate removal of particles of undesired size an extension of somewhat smaller bore than the cartridge and carrying an exit side arm flow tube near the top of the extension was fitted to the cartridge. Water was then pumped upward through the bed at various rates and samples of catalyst particles removed from the bed were collected and analyzed by standard screen analysis. The results are summarized in tabular form below.

| Superficial liquid velocity in ft./sec. | | Percent distribution of catalyst between various screen sizes | | | | |
|---|---|---|---|---|---|---|
| In cartridge | In extension | 20–40 | 40–60 | 60–80 | 80–100 | >160 |
| .16 | .29 | 26 | 33 | 28 | 10 | 3 |
| .20 | .35 | 34 | 57 | 6 | 1 | 1 |
| .24 | .43 | 67 | 28 | >1 | >1 | >1 |
| .28 | .50 | 89 | 2 | >1 | >1 | >1 |
| .32 | .57 | 74 | >1 | >1 | >1 | |

It was observed that particles smaller than about 100 mesh remained suspended in the water phase. The data illustrate that at a superficial flow rate of about 0.20 to 0.30 foot per second particles smaller than 40 mesh are removed from the bed while those larger than 40 mesh are retained.

Example 4

To illustrate the effectiveness of ammonium hydroxide wash treatment for reconditioning an iron hydrogenation catalyst bed which has been deactivated by chloride contaminant, the following experiment was carried out.

For this purpose an iron catalyst made by reducing an iron ore containing about 5% of alumina and which had been used for hydrogenation of adiponitrile (ADN) was purposely deactivated by adding hydrogen chloride (HCl) to the adiponitrile feed. The feed consisted of ammonia/adiponitrile (8:1 weight basis) while circulating 14 s.c.f.h. of hydrogen per pound of adiponitrile at 4900–5000 p.s.i.g. with the liquid feed through the fixed reduced iron catalyst bed. After running 100 hours with 10 p.p.m. of HCl, 72 hours with 50 p.p.m. of HCl and 44 hours with 240 p.p.m. of HCl the catalyst was found to be deactivated. For this experiment the catalyst was considered to have been deactivated when it became incapable of converting 1.0 pound of ADN/lb. of catalyst per hour at 150° C. inlet temperature.

The catalyst bed was washed in place at room temperature with 10 liters of 1% ammonium hydroxide solution per pound of catalyst at a rate of 5 liters per pound of catalyst per hour, corresponding to a superficial liquid velocity of 0.013 foot per second. The catalyst bed was drained and regenerated with hydrogen at 15 p.s.i.g. with an inlet temperature of 460° C. for 48 hours.

As a result of the wash and regeneration, the catalyst regained substantially its original activity as indicated by its hydrogenation at a rate of at least one pound of ADN/lb. of catalyst per hour at an inlet temperature of 120° C. This level of activity persisted for 300 hours at which time the run was terminated.

Example 5

An iron catalyst made by reducing a naturally occurring iron ore in hydrogen was used for hydrogenation of an experimental adiponitrile feed which contained chloride impurities. Analysis of the feed showed about 225 p.p.m. of total chloride by X-ray fluorescence analysis and less than 5 p.p.m. by ionic chloride analysis. After 85 hours at 137° C. inlet temperature the catalyst had become deactivated, as defined in Example 4. The catalyst was washed with 1% by weight ammonium hydroxide following the procedure described in Example 4, reduced with hydrogen and was observed to have regained substantially its catalytic activity as described in Example 4.

Example 6

A catalyst cartridge containing iron catalyst used in commercial hydrogenation of adiponitrile was removed from the production unit because of catalyst deactivation. The degraded catalyst was washed in place with a 1% ammonium hydroxide solution at a rate ranging from 1.4 to 6.6 liters/hour/lb. of catalyst for a period of four hours with the solution passing upward through the bed at a superficial velocity ranging from 0.05 to 0.225 foot per second. The circulation of ammonium hydroxide solution was stopped, the bed was flushed with water for 45 minutes and thereafter reduced with hydrogen at 460° C. inlet temperature for 24 hours. On replacement of the reconditioned catalyst in the synthesis unit adiponitrile was hydrogenated at a rate of 0.75 pound per pound of catalyst per hour, which was substantially the same hydrogenation rate achieved with the originally activated catalyst. Catalyst fines are also removed by the reconditioning treatment.

What is claimed is:

1. A process of in situ reconditioning of a particulate catalyst bed used for hydrogenation of adiponitrile, and which has been degraded by chloride containing contaminant, the catalyst consisting essentially of substantially elemental iron, which comprises passing upward through the catalyst bed at a superficial velocity in the range of about 0.01 to about 0.9 foot per second an aqueous ammonium hydroxide solution containing at least 0.5% by weight of ammonia for a time sufficient to remove the contaminant from the bed while retaining in the bed the reconditioned iron catalyst, and reactivating the reconditioned catalyst by exposure to hydrogen at a pressure of at least 0.01 atmosphere and at a temperature in the range of about 300° C. to about 600° C.

2. The process of claim 1 wherein the superficial velocity of the ammonium hydroxide solution is at least 0.1 foot per second to remove, additionally, catalyst fines from the catalyst bed.

3. The process of claim 2 wherein the superficial velocity of the ammonium hydroxide solution is in the range of 0.2 to 0.3 foot per second to remove substantially from the bed catalyst particles of size smaller than about 40 mesh while retaining catalyst particles of size larger than about 40 mesh.

References Cited

UNITED STATES PATENTS

| | | | |
|---|---|---|---|
| 3,696,153 | 10/1972 | Kershaw et al. | 260—583 K |
| 3,217,026 | 11/1965 | Vertnik | 260—583 K |
| 3,524,822 | 8/1970 | Frankovich et al. | 252—412 |
| 2,500,776 | 3/1950 | Teter | 252—411 R |
| 3,194,844 | 7/1965 | Silber et al. | 252—412 |
| 3,135,699 | 6/1964 | Herzog et al. | 252—412 |

DANIEL E. WYMAN, Primary Examiner

P. E. KONOPKA, Assistant Examiner

U.S. Cl. X.R.

252—420; 260—583 K